(12) United States Patent
Jonsson

(10) Patent No.: US 7,649,967 B2
(45) Date of Patent: Jan. 19, 2010

(54) METHOD AND DEVICE FOR ESTIMATING A SIGNAL TO INTERFERENCE RATIO (SIR) IN WIDEBAND CODE DIVISION MULTIPLE ACCESS (WCDMA) SYSTEMS

(75) Inventor: Elias Jonsson, Malmö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 646 days.

(21) Appl. No.: 10/530,370

(22) PCT Filed: Aug. 20, 2003

(86) PCT No.: PCT/EP03/09208

§ 371 (c)(1),
(2), (4) Date: Sep. 19, 2005

(87) PCT Pub. No.: WO2004/034614

PCT Pub. Date: Apr. 22, 2004

(65) Prior Publication Data

US 2006/0014487 A1     Jan. 19, 2006

Related U.S. Application Data

(60) Provisional application No. 60/418,912, filed on Oct. 16, 2002.

(30) Foreign Application Priority Data

Oct. 11, 2002    (EP) .................................. 02022734

(51) Int. Cl.
*H03D 1/04*    (2006.01)

(52) U.S. Cl. ..................... 375/346; 375/285; 455/296
(58) Field of Classification Search ................. 375/346, 375/285; 455/296
See application file for complete search history.

(56) References Cited

U.S. PATENT DOCUMENTS 5,812,542 A * 9/1998 Bruckert et al. ............. 370/335

(Continued)

FOREIGN PATENT DOCUMENTS

EP     0 969 604     1/2000

(Continued)

OTHER PUBLICATIONS

Fukumoto, "Field experiments on closed loop mode transmit diversity in WCDMA forward link", NTT DoCoMo Inc., Kanagawa, this paper appears in: 2000 IEEE Sixth International Symposium on Spread Spectrum Techniques and Applications, Publication Date: 2000 vol. 2, pp. 433-438 vol. 2.*

(Continued)

*Primary Examiner*—Juan A Torres
(74) *Attorney, Agent, or Firm*—Michael G. Cameron

(57) ABSTRACT

A method and device (100) for estimating a signal to interference ratio (SIR) of a signal transmitted from a first unit and to a remotely located second unit in a Wideband Code Division Multiple Access (WCDMA) wireless communication system. The transmitted TPC (Transmit Power Control) is checked and upon this result the SIR is determined. The checking of the TPC includes the estimation of the previous and the present power using a weighted contribution of the pilots and the data.

14 Claims, 5 Drawing Sheets

U.S. PATENT DOCUMENTS

| | | | |
|---|---|---|---|
| 6,070,086 A * | 5/2000 | Dobrica | 455/522 |
| 6,426,971 B1 * | 7/2002 | Wu et al. | 375/227 |
| 6,728,302 B1 * | 4/2004 | Dabak et al. | 375/148 |
| 6,760,320 B1 * | 7/2004 | Bune | 370/342 |
| 6,804,311 B1 * | 10/2004 | Dabak et al. | 375/347 |
| 6,816,717 B1 * | 11/2004 | Sipila | 455/277.2 |
| 6,845,237 B2 * | 1/2005 | Moulsley | 455/422.1 |
| 7,096,034 B2 * | 8/2006 | Zhang et al. | 455/522 |
| 7,184,497 B2 * | 2/2007 | Jeske et al. | 375/346 |
| 2002/0082038 A1 * | 6/2002 | Mochizuki | 455/522 |
| 2003/0100267 A1 * | 5/2003 | Itoh et al. | 455/69 |
| 2003/0174686 A1 * | 9/2003 | Willenegger et al. | 370/342 |
| 2004/0160921 A1 * | 8/2004 | Kaipainen et al. | 370/335 |
| 2004/0233871 A1 * | 11/2004 | Seki et al. | 370/331 |
| 2004/0248581 A1 * | 12/2004 | Seki et al. | 455/450 |

FOREIGN PATENT DOCUMENTS

| | | |
|---|---|---|
| EP | 1 249 951 | 10/2002 |
| WO | WO-02/41530 | 5/2002 |

OTHER PUBLICATIONS

Chen Chaoyang, "Optimum TPC command sequence in WCDMA" 2001 International Conferences on Info-tech and Info-net, 2001, Proceedings, ICII 2001—Beijing. vol. 2, Oct. 29-Nov. 1, 2001 pp. 134-138 vol. 2.*

Grandell, "Closed-loop power control algorithms in soft handover for WCDMA systems", IEEE International Conference on Communications, 2001. ICC 2001. vol. 3, Jun. 11-14, 2001 pp. 791-795 vol. 3.*

Young-Shin Yoon, "Adaptive SIR estimation in WCDMA systems", IEEE 55th Vehicular Technology Conference, 2002, VTC Spring 2002. vol. 1, May 6-9, 2002 pp. 275-279 vol. 1.*

* cited by examiner

METHOD AND DEVICE FOR ESTIMATING A SIGNAL TO INTERFERENCE RATIO (SIR) IN WIDEBAND CODE DIVISION MULTIPLE ACCESS (WCDMA) SYSTEMS

This patent application claims the benefit of priority from U.S. Provisional Patent Application Ser. No. 60/418,912 filed on Oct. 16, 2002. This application incorporates by reference the entire disclosure of U.S. Provisional Patent Application Ser. No. 60/418,912.

TECHNICAL FIELD OF THE INVENTION

The present invention relates generally to a method and device for estimating the signal-to-interference ratio (SIR) of signals transmitted in wireless communication networks through an air interface. More particularly, the invention relates to a method and device for signal to interference estimation in WCDMA (Wideband Code Division Multiple Access) Radio Access Networks. Even more particularly, the invention relates to a robust and precise SIR estimation under conditions with noise disturbed transmission channels and unknown contents of the transmitted data.

BACKGROUND OF THE INVENTION

Power control is important for capacity and efficiency in mobile WCDMA systems. For example, if a mobile transmitter/receiver unit, such as a mobile radio terminal, is located close to a base station transmitter/receiver, the power level of signals, which are wireless transmitted over an air interface to the mobile unit from the base station, in absence of adjustment, would be comparatively high. This could interfere with transmissions to other mobile units located farther away from the base station. Conversely, the signal power of transmissions from a mobile unit, which was located far from the base station, could be comparatively weak. Accordingly, it has become common practice to provide a transmission power control in such wireless communication systems.

Currently, power control is accomplished by estimating the signal to interference ratio (SIR) of received signals. If the SIR of a signal received at a mobile unit is lower than a threshold value, a command or adjustment signal is sent to the transmitting base station to increase transmission power. The command is sent on the reverse link of the communication system, which could either be the uplink or the downlink, depending on which link is controlled. If the estimated SIR is higher than the threshold value, a command to decrease transmission power is sent, or vice versa.

More specifically, as is well known to those skilled in the art, the signal to interference ratio is a crucial quantity in the inner loop power control. In a typical power control system, see FIG. 1B, the outer loop sets the reference target SIR and the inner loop adjusts the transmitted power such that the estimated SIR agrees with the reference or target SIR. The inner loop controls the communication between a base station and a mobile user equipment and vice versa. This is achieved by giving power up or power down commands, that is, TPC (Transmit Power Control, as mentioned above) equals one or zero respectively. To each transport block there is a cyclic redundancy check (CRC). If the decoded CRC is determined to be correct, the CRC error flag (CRCef) is set to zero, otherwise to one. Filtering or averaging the CRCef in another appropriate way obtains an estimate of the block error rate (BLER). Usually the outer loop consists of an appropriate regulator that adjusts the reference SIR value depending on the discrepancy between the reference BLER and the estimated BLER. The purpose of the power control is to keep the estimated BLER as close as possible to the reference BLER.

The inner loop runs usually at such a frequency that a new SIR estimate is produced every slot. In the 3GPP specification it is suggested that the pilot symbols be used for the SIR estimation. The user equipment (UE), such as a mobile radio terminal, is required to produce a TPC command within 512 chips beginning from the first arrived propagation channel path, see FIG. 2. The relative power difference between the data symbols and the pilot symbols is known. The transmitted power change is always done at the beginning of the pilot field. However, using only the pilots in estimating the SIR produces very noisy estimates, which in turn produces a large variance on the transmitted powers.

It is not desired to have such a variance of transmitted powers as both the UE and the base-station benefit from a low variance in the transmitted power. With a low variance of transmitted powers, e.g. a lower average transmitted power can be achieved and thus additional capacity in the base-station and less power consumption at the UE is achieved.

U.S. Pat. No. 6,070,086 discloses the use of the data bits as well as the pilots for estimating the SIR. The data bits are added coherently, whereby the sent bits have to be known. In U.S. Pat. No. 6,070,086 hard decisions are made on the data bits. This implies that few mistakes in decoding the sent data bits are made, if the channel quality is good. Thus they can consequently be useful in estimating a more precise SIR. However, the contrary is true if the channel is of poor quality due to e.g. noise or other disturbances.

Furthermore, in the above mentioned state-of-the-art method the power estimates of the pilot and data symbols are given equal weights and the sent TPC command is always assumed to be received correctly. In practice this is not always the case, thus resulting in inaccurate SIR estimation. It is believed that power is changed in one direction, i.e. up or down depending on the TPC data, but in reality it is changed in the other direction, because the received TPC data has been modified by transmission errors. This results in an inaccurate SIR estimation and causes also high variance of the transmitted power, as mentioned above.

Therefore, a need exists for a robust and precise SIR estimate under conditions with noise disturbed transmission channels and unknown contents of the transmitted data.

SUMMARY OF THE INVENTION

The present invention overcomes the above-identified deficiencies in the art by providing a robust and precise SIR estimate according to the appended independent claims.

The SIR estimation is performed for a signal transmitted from a first unit and to a remotely located second unit in a Wideband Code Division Multiple Access (WCDMA) wireless communication system, whereby the signal is transmitted through an air interface. A Transmit Power Control (TPC) verification is performed and the SIR estimation depends on the result of the TPC verification.

According to an aspect of the invention, a method is provided, comprising the steps of verifying a transmitted Transmit Power Control (TPC) command, and giving a SIR estimation depending on the result of said TPC verification.

According to another aspect of the invention, a device is provided, comprising a means for Transmit Power Control (TPC) verification (40) having an output signal, a means for SIR estimation (50), whereby the SIR estimation depends on said output of said TPC verification unit.

According to yet another aspect of the invention, a computer readable medium is provided, having a plurality of computer-executable instructions for performing the method according to the invention.

The SIR estimate according to the invention is operable under conditions with noise disturbed transmission channels and unknown contents of the transmitted data. The SIR estimation according to the invention is more accurate and robust than those of the prior art.

Averaging is performed only over one symbol and the need of making hard decisions on the symbols is eliminated, thus resulting in a simpler power estimator. However, averaging can also be performed over more than one symbol.

BRIEF DESCRIPTION OF THE DRAWINGS

Preferred embodiments of the present invention will be described in the following detailed disclosure, reference being made to the accompanying drawings, in which.

DETAILED DESCRIPTION OF EMBODIMENTS

A more complete understanding of the method and device according to the invention will be derived from the following detailed description of embodiments of the invention in conjunction with the appended drawings and claims. For this purpose, some definitions of terms will be given.

Figure 3:
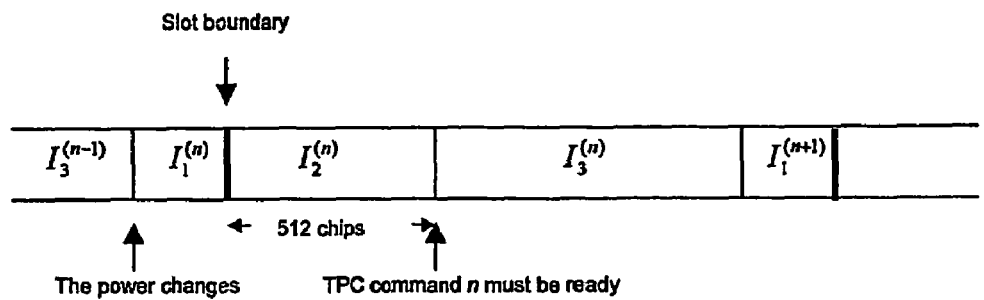
FIG. 3 illustrates the partitioning of slots for the downlink at the UE.

In FIG. 3 $I_1^{(n)}$ denotes the pilot symbols at time n; $I_2^{(n)}$ denotes the data symbols in data field one and the TPC symbols; $I_3^{(n)}$ denotes the TFCI (Transport Format Combination Indicator) symbols and the data symbols in data field two. As illustrated in FIG. 3, the TPC command is to be computed at the end of interval $I_2^{(n)}$. For an easier understanding of the reasoning below, only the data symbols in $I_2^{(n)}$ and $I_3^{(n)}$ will be used for the downlink power estimation.

Figure 4:
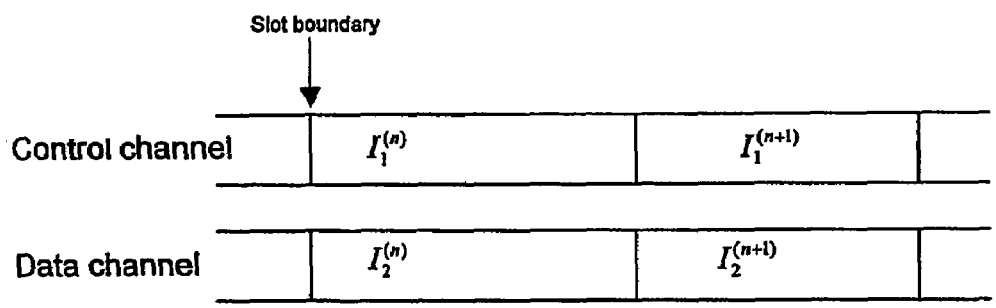
FIG. 4 illustrates the partitioning of slots for the up-link at UTRAN, whereby the control channel is the Dedicated Physical Control Channel (DPCCH) and the data channel is the Dedicated Physical Data Channel (DPDCH)

In FIG. 4, $I_1^{(n)}$ denotes the pilot symbols, TPC, TFCI, and FBI (Feedback Information) symbols, and $I_2^{(n)}$ denotes the data symbols. To simplify the analysis only the pilot symbols will be used in $I_1^{(n)}$.

$\Delta_{TPC}$ denotes the change of power in dB, which results from a TPC command, and $\Delta_{rel}$ is the relative power discrepancy between pilot and data symbols in dB. $\Delta_{rel}$ is usually known. Otherwise $\Delta_{rel}$ is found by filtering the quotient of the estimated power between pilot and data symbols.

Generally, x is a complex number, and x* is the conjugate and |x| is the absolute value. If x is a random variable, the expectation is denoted by E(x).

The despread received symbol is given by $y_j$, whereby $$y_j = h_j x_j + n_j.$$

Here, the propagation channel is modelled by $h_j$ for symbol j, the sent symbol is $x_j$, and thermal noise, quantization noise, as well as the intra/inter cellular interference noise is given by $n_j$ for symbol j. The complex symbol $x_j$ is scaled to have length one. The noise is assumed to be uncorrelated, zero mean, with variance $\sigma^2$. Only one multi-path delay is considered here. The reasoning for several multi-path delays is done in the same manner, applying the below reasoning for each delay. The reasoning below is also restricted to the down-link since it is the slightly more complicated case and is modified for the up-link case, if desired.

Figure 5:
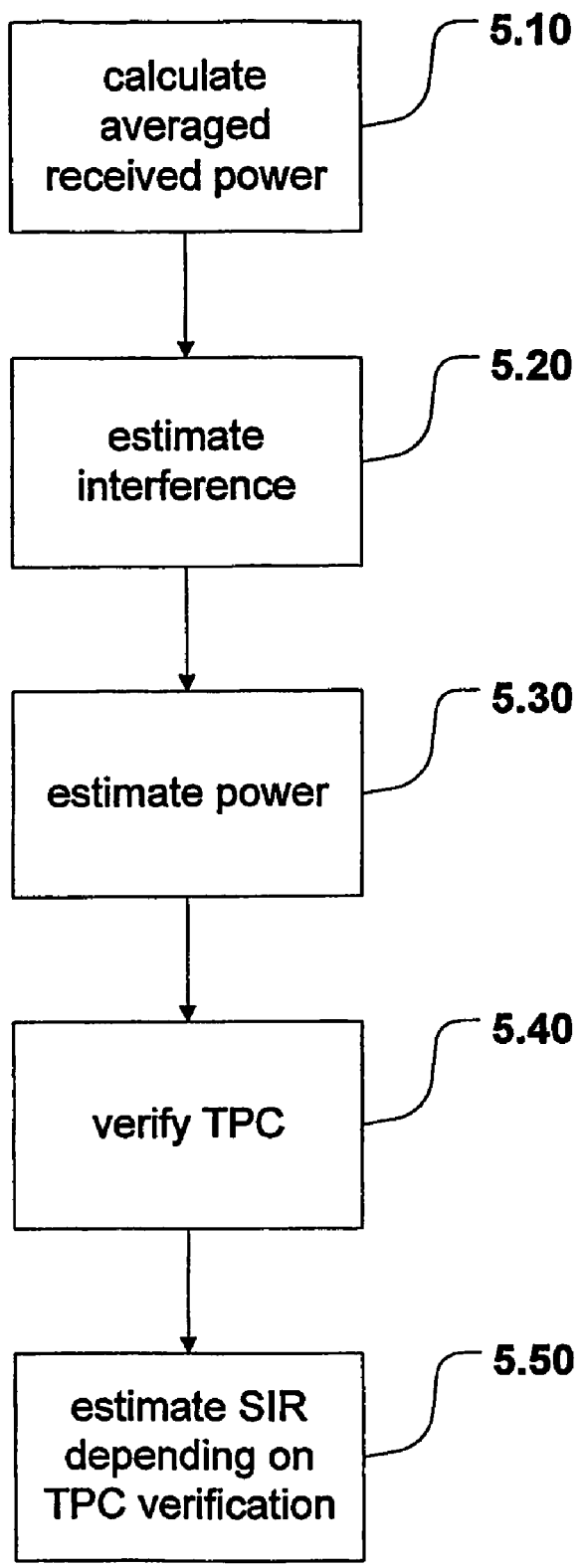
FIG. 5 is a flow chart illustrating an embodiment of the method according to the invention.

FIG. 5 shows an embodiment of the method according to the invention. In FIG. 5 the TPC verification and SIR estimation is performed as follows. $P_i^{(n)}$ is the average received power for the symbol or a subset of symbols in interval $I_i^{(n)}$. Denote the subset of symbols in $I_i^{(n)}$ as $y_{j_k}^{(n,i)}$, k=1, ..., $N_i$. Here, $N_i$ is the number of symbols used in interval $I_i^{(n)}$, and $j_k$ is enumerating the selected symbols, where k is the index for the subset. The average received power is calculated in 5.10 as $$P_i^{(n)} = \frac{1}{N_i} \sum_{k=1}^{N_i} y_{j_k}^{(n,i)} (y_{j_k}^{(n,i)})^*$$

and the expectation of $P_i^{(n)}$ is given by $$E(P_i^{(n)}) = \frac{1}{N_i} \sum_{k=1}^{N_i} |h_{j_k}|^2 + \sigma^2$$

In this case it is assumed that we have no transmit diversity. Though, in the case of transmit diversity where the data symbols are encoded using space-time transmit diversity (STTD) and two transmit antennas are used, the same formula is valid, which will be shown below.

The interference is estimated from the pilot symbols in 5.20 as $$N^{(n)} = \frac{1}{N_P - 1} \sum_{j=1}^{N_P} \left| y_j^{(n,1)} - \frac{1}{N_P} \sum_{k=1}^{N_P} y_k^{(n,1)} (x_j^{(n,1)})^* \right|^2$$

Very often the interference is modelled as being a slow changing process. In this case it is possible to filter the variable $N^{(n)}$ to get a better estimate. Though, the remaining reasoning below holds whether filtered or unfiltered noise estimates are used.

The SIR is estimated at time n as $$SIR_{est}^{(n)} = \frac{P^{(n)}}{N^{(n)}} - 1. \tag{1}$$

Here, $P^{(n)}$ is the estimated power, given by $$P^{(n)} = w_3 P_3^{(n-1)} \cdot 10^{0.1 \Delta_{TPC}^{(n-1)}} + w_1 P_1^{(n)} \cdot 10^{0.1 \Delta_{rel}} + w_2 P_2^{(n)}$$

depicted as 5.30.

One is subtracted in equation (1) to account for the noise. Here $w_i \geq 0$, for i=1, ..., 3 and it is $$w_1 + w_2 + w_3 = 1$$

Preferably, the weights are selected, for example, in relation to the contributed energy. That is, $$w_1 = \frac{N_1}{N_1 + 10^{-0.1\Delta_{rel}}N_2 + 10^{-0.1\Delta_{rel}}N_3},$$

$$w_2 = \frac{10^{-0.1\Delta_{rel}}N_2}{N_1 + 10^{-0.1\Delta_{rel}}N_2 + 10^{-0.1\Delta_{rel}}N_3} \text{ and }$$

$$w_3 = \frac{10^{-0.1\Delta_{rel}}N_3}{N_1 + 10^{-0.1\Delta_{rel}}N_2 + 10^{-0.1\Delta_{rel}}N_3}.$$

It is assumed that the TPC command at time n−1 has been received correctly at the base-station. The SIR estimator given by equation (1) is extended to use older information, i.e. information from slots being transmitted at times before n−1, if desired, by assuming that all TPC commands are received correctly. However, this is limited because the propagation channel changes due to fading. If knowledge about the rate of change of the propagation channel is available, a SIR estimator is used that controls the amount of old information depending on the rate of change of the propagation channel.

TPC is verified in 5.40 as follows.

It is $\Delta_{TPC}^{(n-1)} = \pm \Delta_{TPC}$ dB, depending on if we have a power up (+) or power down (−) command. Take $$\hat{P}_{est}^{(n)} = \hat{w}_1 P_1^{(n)} \cdot 10^{0.1\Delta_{rel}} + \hat{w}_2 P_2^{(n)} \quad (2),$$

which only uses pilot and data symbols after the transmitted power change. Then, it is $$\overline{P}_{est}^{(n-1)} = \overline{w}_1 P_1^{(n-1)} \cdot 10^{0.1\Delta_{rel}} + \overline{w}_2 P_2^{(n-1)} + \overline{w}_3 P_3^{(n-1)} \quad (3),$$

which is the power in the previous slot counted from where the pilot begins.

The weights in equation (2) and (3) obey the same conditions as the weights in equation (1), as mentioned above.

If a power up command is sent to the base station, the command has been correctly received, if $$|\overline{P}_{est}^{(n-1)} \cdot 10^{0.1\Delta TPC} - \hat{P}_{est}^{(n)}| < c|\overline{P}_{est}^{(n-1)} \cdot 10^{-0.1\Delta TPC} - \hat{P}_{est}^{(n)}| \quad (4)$$

Here, c is a constant. If c=1 it means that the difference in distance from the previous estimated power at time n−1 is compared, $\overline{P}_{est}^{(n-1)} \cdot 10^{\pm 0.1\Delta TPC}$, given a power up or down command, to the estimated power in slot n, $\hat{P}_{est}^{(n)}$. If c is set to c>1, then a bias towards picking the sent TPC command is introduced. This is used when the power estimates are corrupted by a lot of noise.

In 5.50, SIR is estimated as follows, depending on the result of the TPC verification from 5.40. If equation (4) is true, i.e. the power command has been received correctly, the estimated SIR at time n is according to one embodiment of the invention:

$$SIR_{est}^{(n)} = \frac{w_3 P_3^{(n-1)} \cdot 10^{0.1\Delta TPC} + w_1 P_1^{(n)} \cdot 10^{0.1\Delta_{rel}} + w_2 P_2^{(n)}}{N^{(n)}} - 1 \quad (5)$$

on the other hand, if equation (4) is false, i.e. the power command has not been received correctly, the estimated SIR at time n is according to another embodiment of the invention:

$$SIR_{est}^{(n)} = \frac{w_3 P_3^{(n-1)} \cdot 10^{-0.1\Delta TPC} + w_1 P_1^{(n)} \cdot 10^{0.1\Delta_{rel}} + w_2 P_2^{(n)}}{N^{(n)}} - 1 \quad (6)$$

Similarly, in another embodiment of the invention, if the sent command is a down command it is checked, if $$|\overline{P}_{est}^{(n-1)} \cdot 10^{-0.1\Delta TPC} - \hat{P}_{est}^{(n)}| < c|\overline{P}^{(n-1)} \cdot 10^{01\Delta TPC} - \hat{P}_{est}^{(n)}|$$

is fulfilled.

This concludes the TPC verification and the SIR is estimated using equation (5) or (6). It is possible to include more prior information into $\overline{P}_{est}^{(n-1)}$ in equation (4) if so needed. However, as mentioned above, caution should be taken if the propagation channel changes rapidly.

In a further embodiment of the invention, the data symbols are STTD (space-time transmit diversity) encoded. In this case the power is computed by taking the absolute value of the symbols. However, the symbols must be summed-up pairwise as will become clear from the following reasoning.

When the data symbols are STTD encoded, two consecutive received symbols are described by $$y_j = h^{(1)} x_j - h^{(2)} x^*_{j+1}, \text{ and}$$

$$y_{j+1} = h^{(1)} x_{j+1} + h^{(2)} x^*_j.$$

Where $h^{(1)}$ and $h^{(2)}$ denotes the true propagation channel estimates for antenna one and two.

It is $$|y_j|^2 = |h^{(1)}|^2 + |h^{(2)}|^2 - (h^{(1)})^* h^{(2)} x^*_j x^*_{j+1} - h^{(1)} (h^{(2)})^* x_j x_{j+1}, \text{ and}$$

$$|y_{j+1}|^2 = |h^{(1)}|^2 + |h^{(2)}|^2 + (h^{(1)})^* h^{(2)} x^*_j x^*_{j+1} + h^{(1)} (h^{(2)})^* x_j x_{j+1}.$$

Adding the squared symbols results in $$|y_j|^2 + |y_{j+1}|^2 = 2(|h^{(1)}|^2 + |h^{(2)}|^2),$$

which coincides with the case of no transmit diversity.

Figure 6:
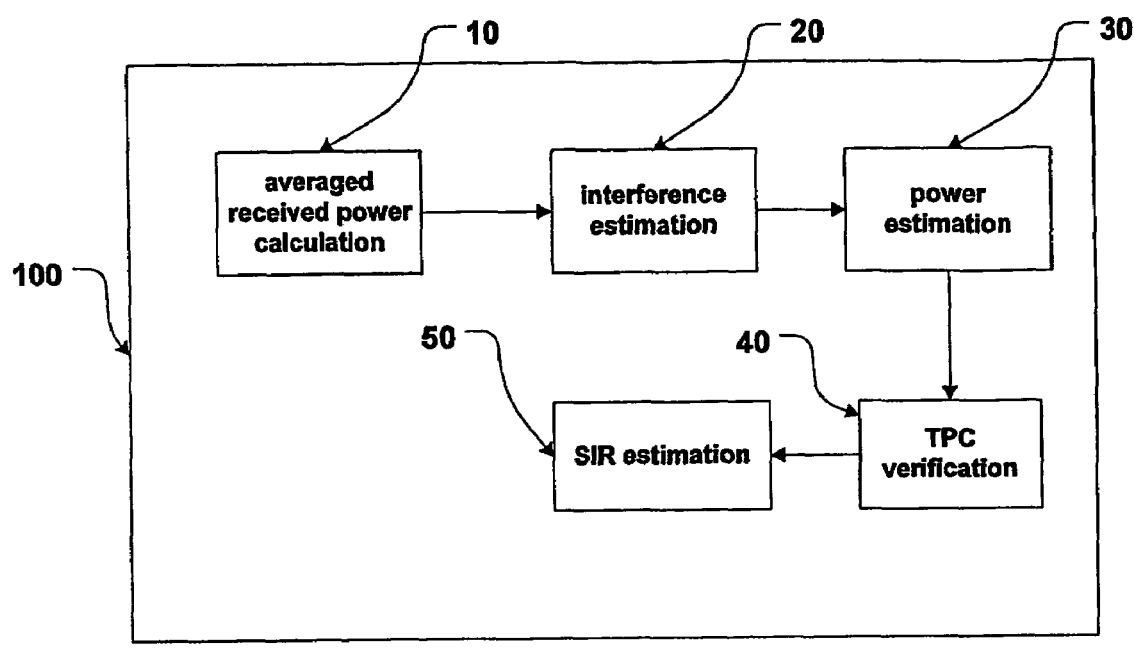
FIG. 6 shows an embodiment of a device according to the invention.

FIG. 6 shows an embodiment of a device 100 of the invention. Device 100 comprises means 10 for calculating the averaged received power, means 20 for estimating the interference, means 30 for estimating the power, means 40 for TPC verification and means 50 for SIR estimation depending on the output of means 40.

In a further embodiment of the invention, respective signals 3 are transmitted from a base station 2 and received at a mobile unit 1.

In yet another embodiment of the invention, respective signals 3 are transmitted from a mobile unit 1 and received at a base station 2.

It is thus to be emphasised that the principle of the invention is applicable to both the downlink and the uplink case.

Furthermore, it should be emphasised that the term "comprises/comprising" when used in this specification is taken to specify the presence of stated features, integers, steps or components but does not preclude the presence or addition of one or more other features, integers, steps, components or groups thereof.

The present invention has been described above with reference to specific embodiments. However, other embodiments than the preferred above are equally possible within the scope of the appended claims.

What is claimed is:

1. A method for use in a Wideband Code Division Multiple Access (WCDMA) wireless communication system for estimating a signal to interference ratio (SIR) of a signal transmitted from a first unit to a remotely located second unit in said WCDMA wireless communication system, said signal being transmitted through an air interface and comprising pilot and data symbols, the method comprising:

verifying, by the first unit, a transmitted Transmit Power Control (TPC) command, by:
- determining, by the first unit, when said TPC command has been correctly received, and
- weighting, by the first unit, said pilot and data symbols wherein said weighting comprises taking into account a power change in said data symbols due to a prior TPC change; and
- giving, by the first unit, a SIR estimation depending on the result of said verifying the transmitted TPC command.

2. The method according to claim 1, comprising encoding said data symbols using space-time transit diversity (STTD).

3. The method according to claim 1, wherein interference is estimated from said pilot symbols.

4. The method according to claim 3, wherein the estimated interference is filtered.

5. The method according to claim 1, wherein the first unit is a base station and the second unit is a mobile unit.

6. The method according to claim 1, wherein the first unit is a mobile unit and the second unit is a base station.

7. A computer readable medium having a plurality of computer-executable instructions for performing the method according to claim 1, comprising:
- a program module for TPC verification giving instructions to a computer, and
- a program module for SIR estimation giving instructions to a computer, depending on the Transmit Power Control (TPC) verification.

8. The method according to claim 1, wherein said giving a SIR estimation depending on the result of said TPC verification comprises:
when said TPC command has been correctly received, the estimated SIR at time n is given as $$SIR_{est}^{(n)} = \frac{w_3 P_3^{(n-1)} \cdot 10^{0.1\Delta_{TPC}} + w_1 P_1^{(n)} \cdot 10^{0.1\Delta_{rel}} + w_2 P_2^{(n)}}{N^{(n)}} - 1$$

and when said TPC command has not been correctly received, the estimated SIR at time n is given as $$SIR_{est}^{(n)} = \frac{w_3 P_3^{(n-1)} \cdot 10^{-0.1\Delta_{TPC}} + w_1 P_1^{(n)} \cdot 10^{0.1\Delta_{rel}} + w_2 P_2^{(n)}}{N^{(n)}} - 1;$$

where $w_i \geq 0$, for $i = 1, \ldots, 3$, $P_i^{(n)}$ is the average received power for the symbol or a subset of symbols in interval $I_i^{(n)}$, $N^{(n)}$ is the estimated interference at time n, $\Delta_{TPC}$ is a change of power in dB, resulting from a prior TPC command, and $\Delta_{rel}$ is a relative power discrepancy between pilot and data symbols in dB.

9. A device for estimating a signal to interference ratio (SIR) of a signal transmitted from a first unit and to a remotely located second unit in a Wideband Code Division Multiple Access (WCDMA) wireless communication system, said signal being transmitted through an air interface and comprising pilot and data symbols, wherein said device comprises;
- a Transmit Power Control (TPC) verification means included in the first unit having an output signal, wherein said TPC verification means weighs said pilot and data symbols by taking into account a power change in said data symbols due to a prior TPC change and determines when a TPC command have been correctly received; and
- a means for SIR estimation, using said output signal as input signal and being arranged to estimate the SIR depending on said output signal of said TPC verification means.

10. The device according to claim 9, wherein said data symbols are encoded using space-time transmit diversity (STTD).

11. The device according to claim 9, further comprising a means for estimating interference from said pilot symbols.

12. The device according to claim 11, further comprising a filter for filtering said estimated interference.

13. The device according to claim 9, wherein the first unit is a base station and the second unit is a mobile unit.

14. The device according to claim 9, wherein the first unit is a mobile unit and the second unit is a base station.

* * * * *

UNITED STATES PATENT AND TRADEMARK OFFICE
CERTIFICATE OF CORRECTION

Figure 1:
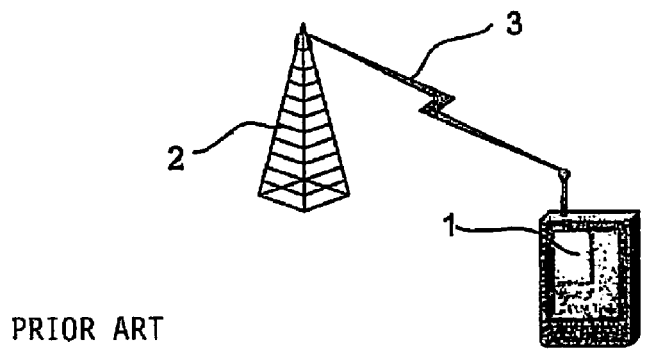
FIG. 1A shows a block diagram illustrating a wireless communication system employing embodiments of the invention.
FIG. 1B is an overview of the power control in WCDMA for a dedicated physical channel.
Figure 1:
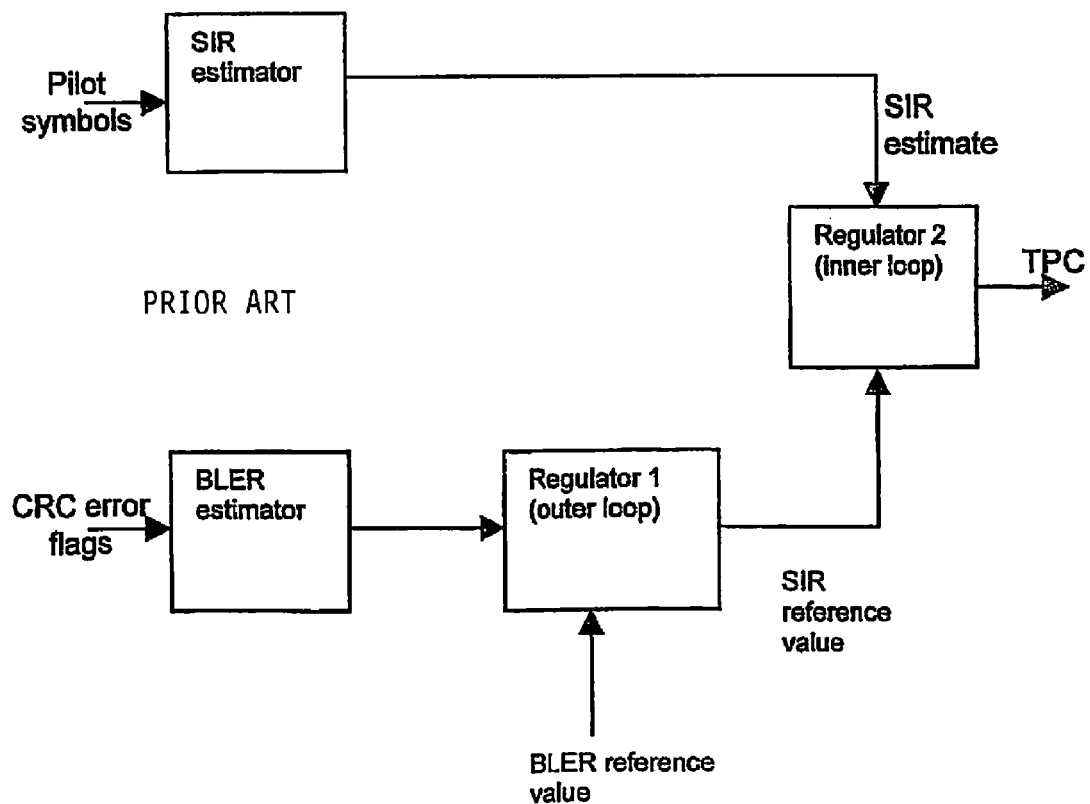
Figure 2:
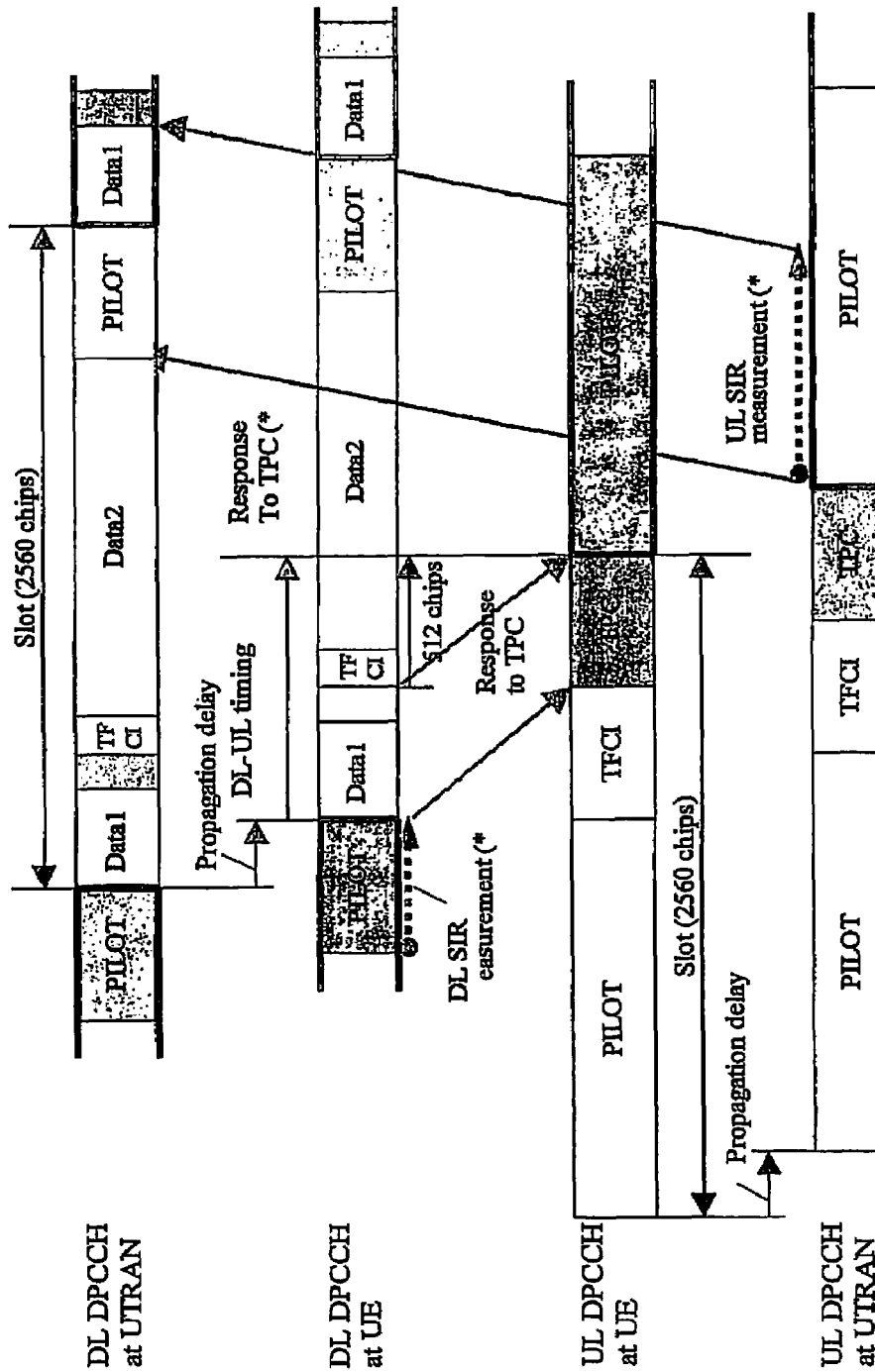
FIG. 2 shows a timing diagram of the transmit control power timing for WCDMA.

PATENT NO. : 7,649,967 B2
APPLICATION NO. : 10/530370
DATED : January 19, 2010
INVENTOR(S) : Jonsson It is certified that error appears in the above-identified patent and that said Letters Patent is hereby corrected as shown below:

In Fig. 2, Sheet 2 of 5, delete "DL SIR easurement(*" and insert -- DL SIR measurement(* --, therefor.

In Column 6, Line 26, delete "$|y_j|^2 = |h^{(1)}|^2 + |h^{(2)}|^2 - (h^{(1)})^* h^{(2)} x^*_j x^*_{j+1} - h^{(1)}(h^{(2)})^* x_j x_{j+1}$, and" and insert -- $|y_j|^2 = |h^{(1)}|^2 + |h^{(2)}|^2 - (h^{(1)})^* h^{(2)} x^*_j x^*_{j+1} - h^{(1)}(h^{(2)})^* x_j x_{j+1}$, and --, therefor.

In Column 7, Line 13, in Claim 2, delete "transit" and insert -- transmit --, therefor.

Signed and Sealed this
First Day of November, 2011

David J. Kappos
*Director of the United States Patent and Trademark Office*